United States Patent [19]

Hioki

[11] 4,397,015

[45] Aug. 2, 1983

[54] APPARATUS FOR MOVING A TONE ARM

[75] Inventor: Shunkichi Hioki, Tokyo, Japan

[73] Assignee: Katoh Electrical Machinery Co., Ltd., Tokyo, Japan

[21] Appl. No.: 233,603

[22] PCT Filed: Jun. 3, 1980

[86] PCT No.: PCT/JP80/00121

§ 371 Date: Feb. 4, 1981

§ 102(e) Date: Feb. 3, 1981

[87] PCT Pub. No.: WO80/02770

PCT Pub. Date: Dec. 11, 1980

[51] Int. Cl.³ .................... G11B 17/06; G11B 19/06
[52] U.S. Cl. .................................... 369/225; 369/216; 369/230
[58] Field of Search ............... 369/216, 225, 226, 230, 369/243, 196

[56] References Cited

U.S. PATENT DOCUMENTS

| | | | |
|---|---|---|---|
| 3,533,632 | 10/1970 | Hammond et al. | 369/243 |
| 3,550,986 | 12/1970 | Takahashi | 369/216 |
| 3,697,087 | 12/1972 | Takahashi | 369/216 |
| 4,183,538 | 1/1980 | Saito | 369/226 |

Primary Examiner—Steven L. Stephan
Attorney, Agent, or Firm—George B. Oujevolk

[57] ABSTRACT

In a record player, the movement of the tone arm is controlled by a select plate operated by a lever which moves the plate to a position corresponding to a record size. Adjacent the select plate is a C-shaped lever which cooperates with a rotary member. The rotary member has a plurality of cams which serve to program the operation and various movements of the tone arm. Extending from the peripheral edge of one of said cams is a brush. The tone arm is also responsive to a bracket with a wall, said wall being engaged by the brush. A position detector plate is mounted on the bracket which cooperates with a photo-interrupter to detect the position of the tone arm with respect to a record being played.

1 Claim, 12 Drawing Figures

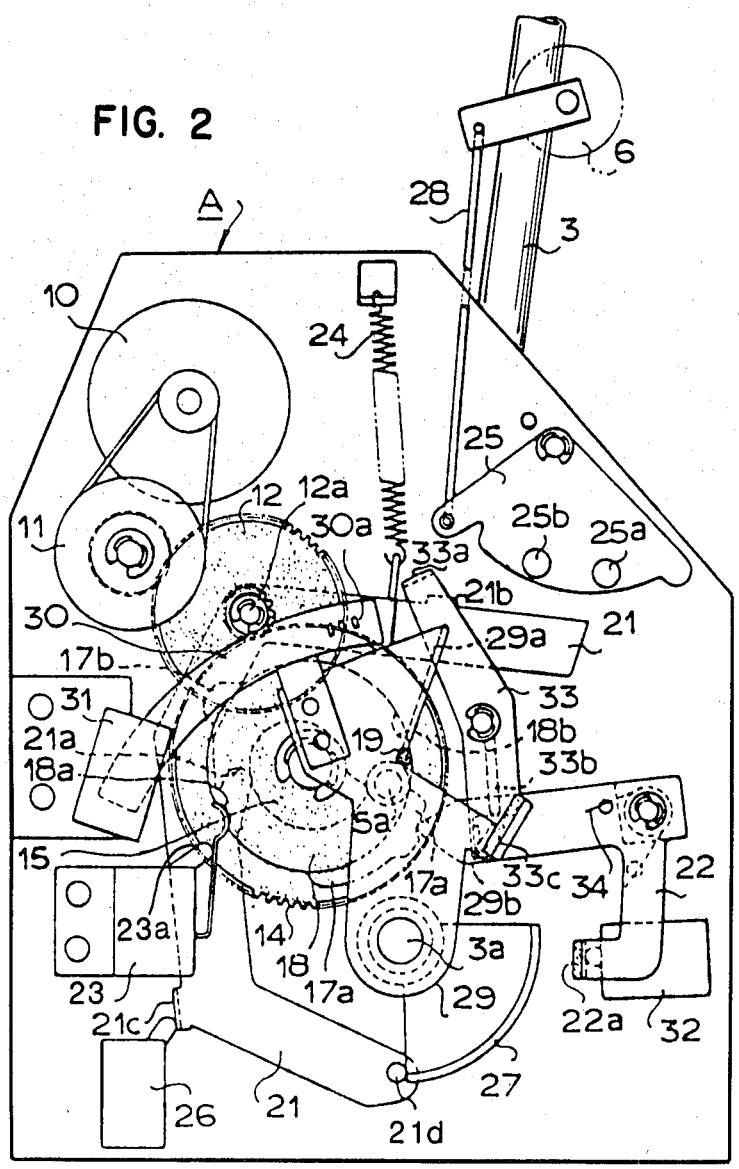

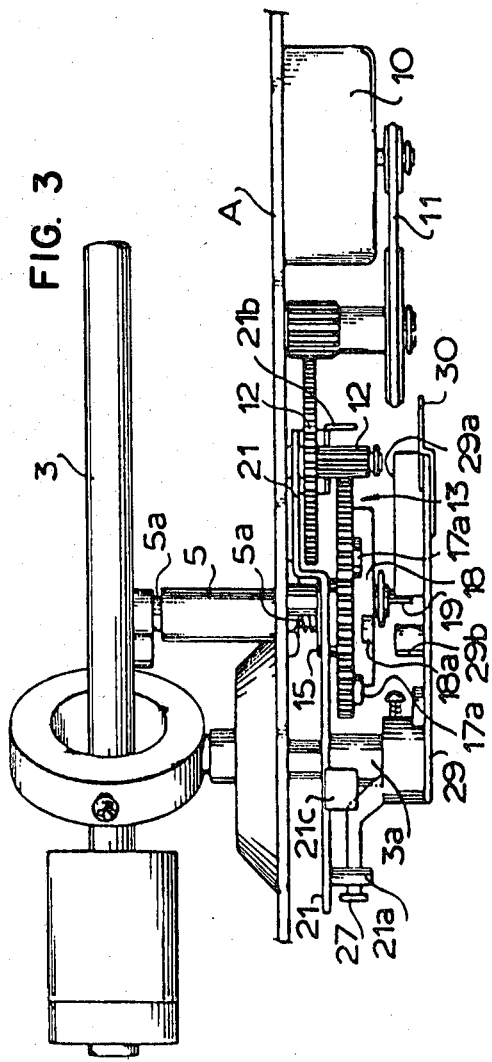

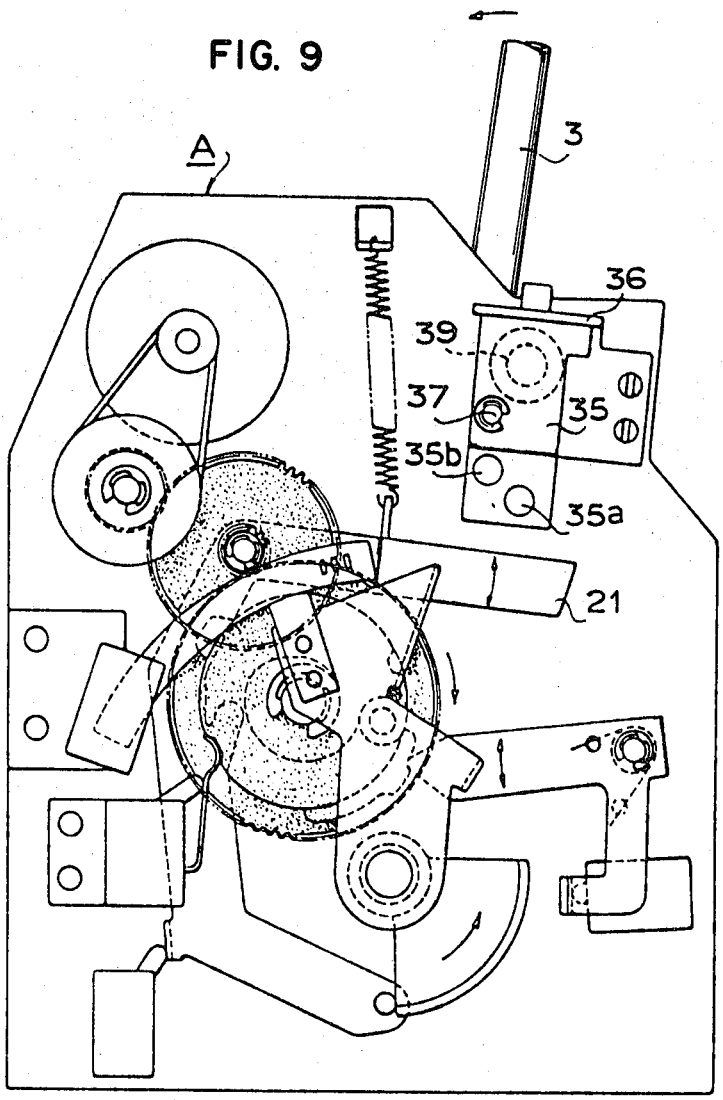

APPARATUS FOR MOVING A TONE ARM

DESCRIPTION

1. Technical Field

This invention relates to an apparatus for moving a tone arm in a record player.

2. Background Art

From the viewpoint of their drive systems, apparatus for moving a tone arm can be broadly classified into the turntable drive system which utilizes the driving force of a turntable and the exclusive motor drive system which employs the driving force of a driving motor for exclusive use in addition to the driving force of a turntable. The former requires driving-force transmission means for transmitting the drive force of the turntable to a tone arm shaft as desired, and becomes very complicated structurally. As regards the latter, granted that the driving force of the exclusive motor is similarly transmitted to a tone arm shaft, the exclusive motor can be disposed in proximity to the tone arm shaft, which brings forth the advantage that a structure simpler than the structure of the turntable drive system is permitted. Since, however, the driving motor is expensive, the latter has the disadvantage that the fabrication cost as the whole system is high.

On the other hand, in recent years, the apparatus for moving the tone arm is usually constructed so that the lead-in operation of the tone arm can be made also manually in order to select an arbitrary piece of music midway on a disk and play it.

OBJECTS OF THE INVENTION

The principal object of this invention is to provide an apparatus for moving a tone arm in a record player that employs the exclusive motor drive system as its drive system for the tone arm, the apparatus having its structure simplified to the utmost and reducing to the utmost the increase of its cost due to the cost of a driving motor.

Another object of this invention is to provide an apparatus for moving a tone arm in a record player to make it possible to play a record through either an automatic or a manual operation for the tone arm.

Still another object of this invention is to provide an apparatus for moving a tone arm in a record player which can stabilize the auto-lead-in operation and auto-return operation of the tone arm.

Further objects, features and advantages of this invention will become apparent from the following detailed description and the accompanying drawings in which:

BRIEF DESCRIPTION OF THE DRAWINGS

FIG. 2 is a bottom view of an apparatus for moving a tone arm according to this invention.

FIG. 3 is a partial side view of the apparatus.

FIG. 9 is a bottom view showing another aspect of performance of a select plate.

FIG. 10 is a side view of the select plate.

FIG. 11 is a side view of the select plate showing an operating relationship thereof.

FIG. 12 is a partial plan view showing still another aspect of performance of the select plate.

DETAILED DESCRIPTION

Figure 1:
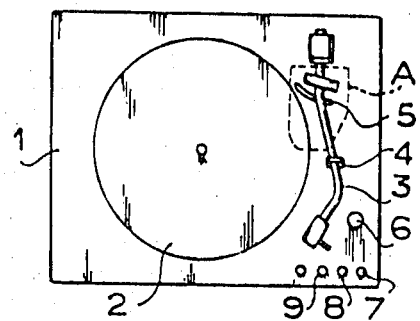
FIG. 1 is a plan view of a record player to which this invention is applied.
Figure 4:
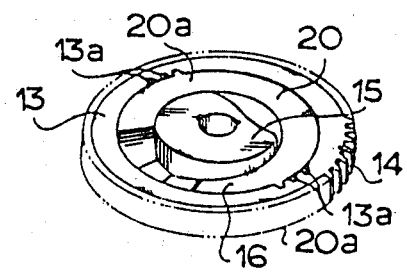
FIG. 4 is a perspective view of a rotary member seen obliquely from above.
Figure 5:
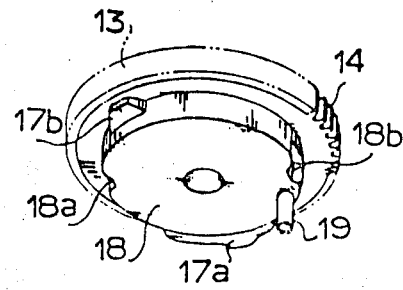
FIG. 5 is a perspective view of the rotary member seen obliquely from below.

Referring to FIGS. 1 to 5, numeral 1 designates a cabinet of a record player, numeral 2 a turntable which is driven by a known direct drive system or indirect drive system, numeral 3 a tone arm which is mounted on the cabinet 1 in a manner to freely move about in the vertical direction and the horizontal direction, numeral 4 an arm rest for the tone arm 3, numeral 5 an arm lifter which moves the tone arm 3 in the vertical direction, numeral 6 a select lever for a record size, numeral 7 a start switch of an automatic performance apparatus for the tone arm according to this invention, numeral 8 a cut switch of the apparatus, and numeral 9 a first repeat switch of the apparatus.

A chassis A is mounted on the inner bottom part of the cabinet 1. The essential portions of the automatic performance apparatus according to this invention are installed on the chassis A.

In substantially the central part of the chassis A, a rotary member 13 which is deceleratedly rotated through a first intermediate gear 11 and a second intermediate gear 12 by means of a driving motor 10 is supported by a shaft. As specifically shown in FIGS. 4 and 5, the rotary member 13 is provided with a gear 14 in its outer periphery. A circumferential cam 15 and a horizontal cam 16, and a circumferential cam 17 and a circumferential cam 18 are superposedly provided on the upper side and the lower side of the rotary member 13, respectively. A brush 19 is suspended from an outer peripheral edge part of the circumferential cam 18.

The horizontal cam 16 disposed on the upper side of the rotary member 13 is such that an endless cam plate 20 provided with a recess in an intermediate part is snugly secured to the rotary member 13. Protuberances 20a, 20a which protrudes from the peripheral part of the cam plate 20 can be successively fitted into a plurality of notches 13a, 13a... provided on the upper side of the rotary member 13, whereby the position of the recess can be adjusted.

A control lever 21 which is supported by an arbor 12a of the second intermediate gear 12 and which presents substantially a C-shape in plan view opposes a pressure receiving projection 21a provided at a web part thereof, to the circumferential cam 15 of the rotary member 13 constructed as described above. The bottom part of an elevation rod 5a of the arm lifter 5 abuts on the horizontal cam 16. One side end of a brake lever 22 whose turning is urged in one direction by a spring 34 abuts on a first convex part 17a of the circumferential cam 17. A contact actuating lever 23a of a switch 23 which is releasing switch means for the driving motor 10 falls in a first concave part 18a of the circumferential cam 18, to turn the switch "off".

The control lever 21 has its turning urged counterclockwise by a coiled tension spring 24 extended between it and the chassis A. One side end of the control lever 21 beyond a fulcrum thereof is provided with an engaging piece 21b, the other side end is provided with a switch pressing piece 21c, and the other side end is further provided with a pressing pin 21d. The side on which the engaging piece 21b is disposed opposes a select plate 25 pivotally mounted on the chassis A, the switch pressing piece 21c opposes to a switch 26 of a motor (not shown) for driving the turntable 2, and the pressing pin 21d opposes to and contacts with a brake drum 27 which is mounted on a tone arm shaft 3a.

The select plate 25 is turned through a coupling rod 28 by the select lever 6 which is disposed on the cabinet 1 so as to protrude, and alternately brings pressure receiving stoppers 25a and 25b, disposed on the lower side so as to protrude in opposition to the control lever 21. A bracket 29 which is provided with a vertical wall 29a and an actuating projecting piece 29b is further mounted on the lowermost part of the tone arm shaft 3a.

The bracket 29 overlaps the lower surface of the rotary member 13. A position detector plate 30 for the tone arm 3 as is provided with a plurality of apertures 30a, . . . is mounted on the front end of the bracket. One end of the position detector plate is fitted in a photo-interrupter 31. On the side of the brake lever 22 close to the brake drum 27, a brake shoe 22a is mounted. A second repeat switch 32 for repeat performance is disposed in opposition to the rear of the brake shoe 22a. On the side of the brake lever close to the rotary member 13, an engaging projective piece 22b is disposed.

A manual lever 33 is supported by a shaft between the brake lever 22 and the control lever 21. On the side of the manual lever 33 close to the control lever 21, an engaging projection piece 33a is provided, and on the side thereof close to the brake lever 22, an engaging projection 33b which is selectively brought into engagement relationship with the engaging projective piece 22b provided in the brake lever 22 is provided. In the position of the manual lever 33 opposing to the actuating projective piece 29b of the bracket 29, a magnet 33c in magnetic attraction relationship with the piece 29b is mounted.

OPERATION OF THE INVENTION

Figure 6:
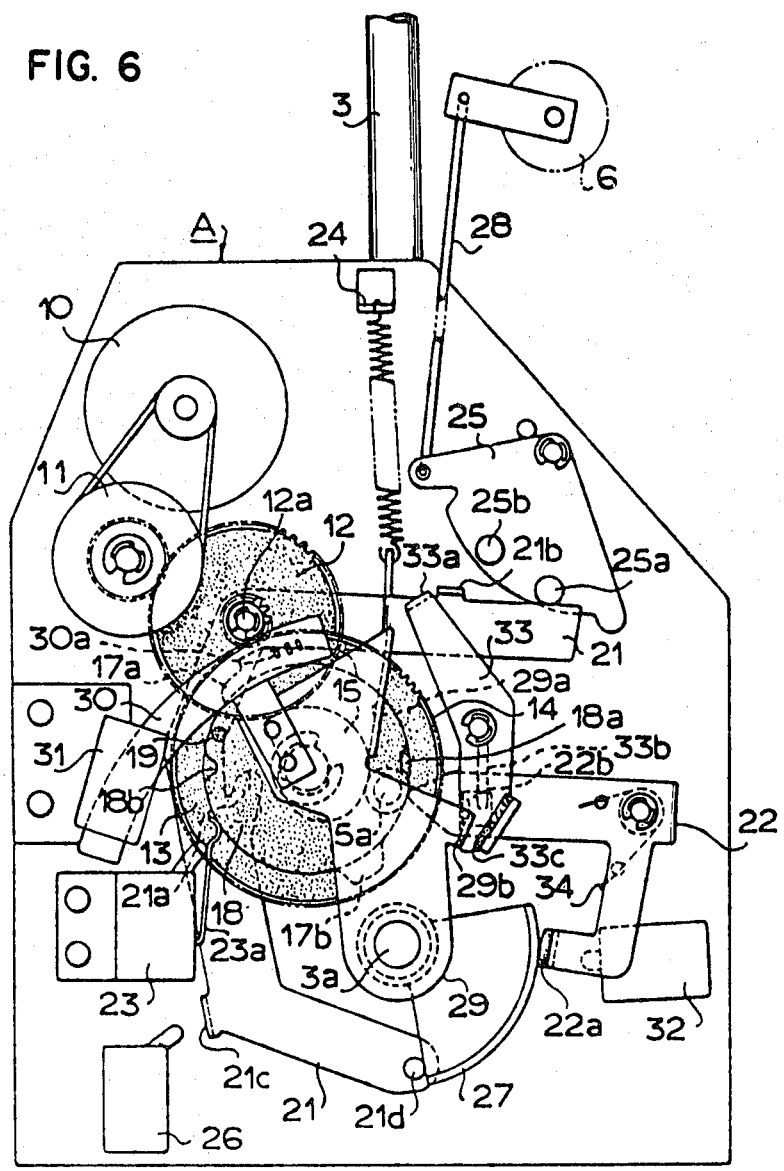
FIG. 6 is a partial bottom view of the apparatus immediately before the end of an auto-lead-in operation.

Now, there will be described a case where the automatic performance of a disk having a diameter of 30 cm takes place under the conditions described. When the select lever 6 is first turned to a position indicated as 30 cm, the select plate 25 turns through the coupling rod 28 to oppose the pressure receiving stopper 25a onto the side of the control lever 21. When the start switch 7 which is a first-period start switch for the driving motor 10 is pressed, the driving motor 10 starts rotating, the driving force thereof is transmitted to the rotary member 13 through the first and second intermediate gears 11 and 12, and the rotary member 13 begins to rotate counterclockwise. Then, the contact actuating lever 23a of the switch 23 comes out of the first concave part 18a of the circumferential cam 18. Simultaneously therewith, the front end of the brake lever 22 is released from the first convex part 17a of the circumferential cam 17 and turns clockwise under the action of the spring 34 to bring the brake shoe 22a into contact with the brake drum 27. The rotary member 13 further rotates, and its circumferential cam 15 gradually releases the pressing action on the pressure receiving projection 21a of the control lever 21. Therefore, the control lever 21 urged to turn counterclockwise by the coiled tension spring 24 turns counterclockwise until one side thereof abuts on the pressure receiving stopper 25a. Thus, the pressing pin 21d pushes one side of the brake drum 27 with the brake function operating, moves the tone arm 3 along with the bracket 29 towards the disk in an exact and stable motion and guides a record stylus, mounted on the front end of the tone arm, over the lead-in groove of the disk 30 cm in diameter. Simultaneously, the switch pressing piece 21c of the control lever comes away from the contact of the switch 26 of the turntable driving motor (not shown) and turns it "on", so that the turntable 2 begins to rotate. These states are illustrated in FIG. 6. At this time, the manual lever 33 which holds the magnet 33c mounted at one end thereof in contact with the actuating projective piece 29b of the bracket 29 intends to rotate together. Since, however, the engaging projective piece 22b provided in the brake lever 22 engages the engaging projection 33b provided in the manual lever 33 and prevents the turning of the manual lever, the manual lever 33 cannot rotate in this case. The stop state of the tone arm 3 over the lead-in groove of the disk is stabilized by the brake action of the contact between the brake shoe 22a provided in the brake lever 22 and the brake drum 27 fastened to the tone arm 3. This prevents the tone arm 3 from coming back lightly after having been guided over the lead-in groove, or from being fed excessively.

Subsequently, the rotary member 13 rotates further. A second convex part 17b of the circumferential cam 17 pushes and rotates the brake lever 22 again, to separate the brake shoe 22a from the brake drum 27. About that time, the elevation rod 5a of the arm lifter 5 falls into the recess of the horizontal cam 16 provided on the rotary member 13, to lower the front end of the tone arm 3 and to bring down the record stylus onto the lead-in groove quietly. Simultaneously, the contact actuating lever 23a of the switch 23 falls into a second concave part 18b of the circumferential cam 18, to open the starting circuit of the driving motor 10 and to stop the motor. Therefore, also the rotary member 13 stops in a position where it has rotated 180°. In this regard, the lead-in operation for the tone arm 3 may of course be ended at an angle of rotation different from 180° so as to stop the rotary member 13 thereat.

Figure 7:
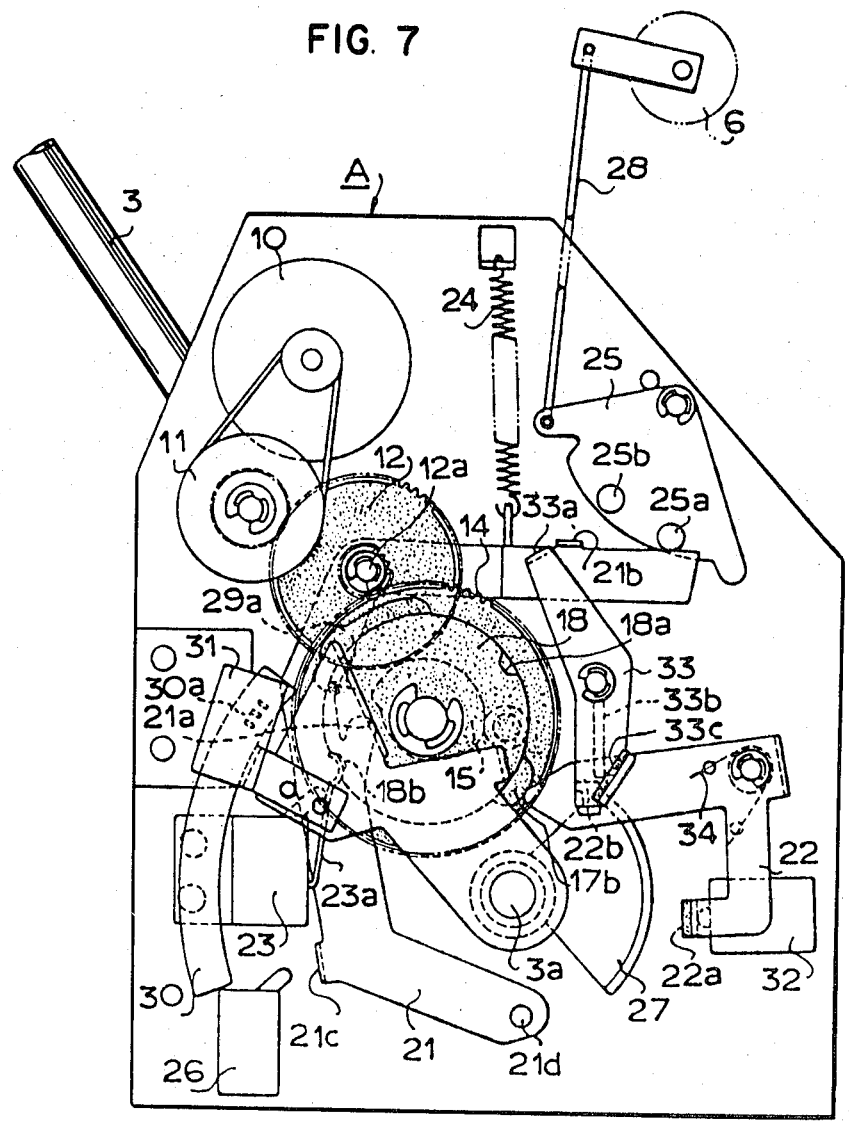
FIG. 7 is a partial bottom view of the apparatus at the end of play.

In this manner, the record performance becomes possible. When the performance has ended and the record stylus has begun to move in a lead-out groove of greater pitch, the photo-interrupter 31 and the position detector plate 30 detect the position of the stylus and sense the end of the record performance as illustrated in FIG. 7. Thus, the starting circuit of the driving motor 10 is closed again via latter-period switch means of a known construction. Therefore, the rotary member 13 starts rotating. The brake lever 22 released from the pressing action of the second convex part 17b of the circumferential cam 17 causes the brake shoe 22a to abut on the brake drum 27 again. While causing the contact actuating lever 23a of the switch 23 to get out of the second concave part 18b of the circumferential cam 18, the brake lever causes the elevation rod 5a of the arm lifter 5 to get out of a concave part 16a of the horizontal cam 16, and it lifts up the front end of the tone arm 3 through the elevation rod. Thereafter, the brush 18 pushes the vertical wall 29a provided in the bracket 29 and turns it clockwise along with the tone arm 3, to return the tone arm 3 onto the arm rest 4. Almost simultaneously with this operation, the circumferential cam 15 turns the control lever 21 counterclockwise to the original position against the tractive force of the coiled tension spring 24. The switch pressing piece 21c presses the contact of the switch 26 of the motor (not shown)

for driving the turntable 2 and turns the motor "off" to stop the turntable 2. Subsequently, the brake lever 22 is pressed and turned by the first convex part 17a of the circumferential cam 17 again. When the brake shoe 22a of the brake lever has come away from the brake drum 27, the contact actuating lever 23a of the switch 23 falls into the first concave part 18a of the circumferential cam 18 to open the starting circuit of the driving motor 10 and to stop the rotary member 13 again. In this state, the automatic performance apparatus is reset so that the tone arm 3 can again be subjected to the auto-lead-in by the next rotation.

Supposing that the first repeat switch 9 protrusively disposed on the cabinet 1 is kept "on" at this time, when the brake lever 22 is pressed and turned by the first convex part 17a of the circumferential cam 17, the rear part of the brake shoe 22a turns "on" the second repeat switch 32. Therefore, the performance is repeatedly made.

In the next place, in case where a disk having a diameter of 17 cm is to be automatically performed, the select lever 6 is turned to a position indicated as 17 cm. Then, the select plate 25 turns through the coupling rod 28 and opposes the pressure receiving stopper 25b to the control lever 21. in consequence, the feed-in width of the control lever 21 at the lead-in becomes greater than in the foregoing. Under this condition, the tone arm 3 is moved over the lead-in groove of the disk 17 cm in diameter. Subsequent operations are the same as in the case of the disk 30 cm in diameter.

Now, in case where the performance is to be ended in the course of the record play, the cut switch 8 protrusively disposed on the cabinet 1 is pressed. Then, the driving motor 10 is rotated, and an auto-return operation which is not based on the photo-interrupter 31 and the position detector plate 30 is made. By operations as stated above, the tone arm 3 is returned to the arm rest 4 and the automatic performance apparatus is set towards the next auto-lead-in operation.

In this manner, the automatic performance apparatus according to this invention can execute the auto-lead-in operation of the tone arm 3 even when the position regulating lever which is controlled by the rotary member is excluded. Moreover, the tone arm 3 is moved in the state in which the brake function is operating, both during the auto-lead-in operation and during the auto-return operation. Therefore, the instabilities of operations during the movement of, and at the end of the operation of, the tone arm 3 and fluctuations such as return-back can be perfectly checked.

Figure 8:
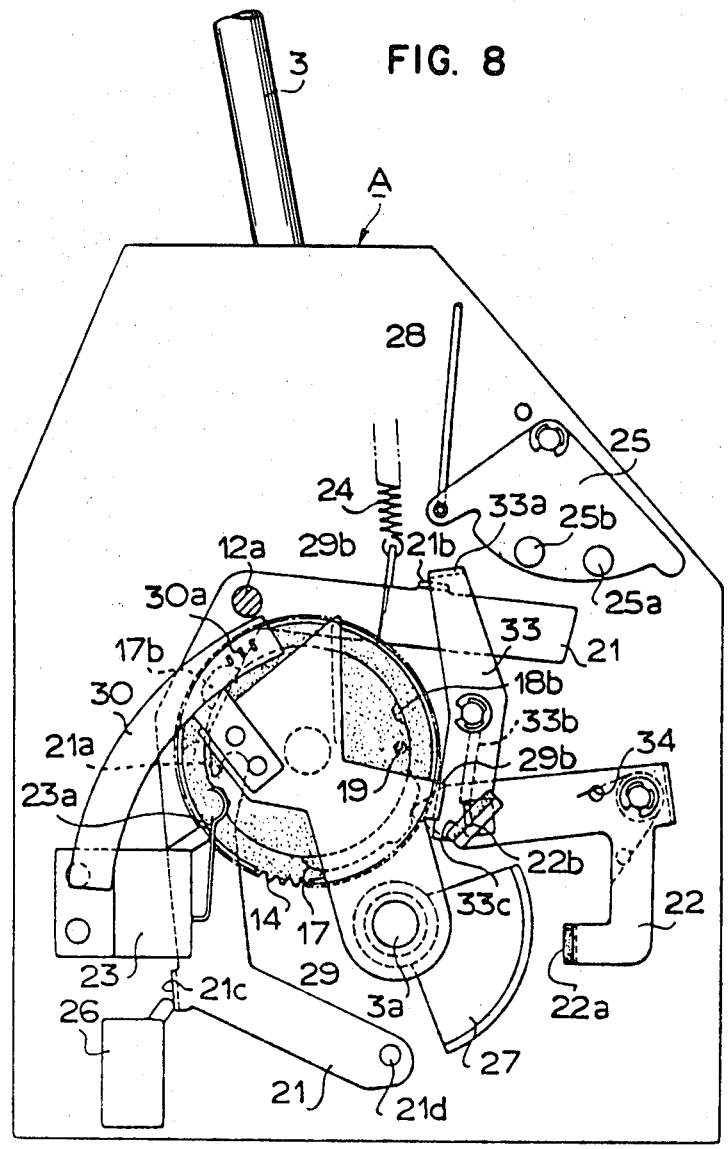
FIG. 8 is a partial bottom view showing a case where the tone arm has been led in by a manual operation.

In the next place, in case where the tone arm 3 is to be led in by the manual operation, the tone arm 3 is moved to a desired position on a disk by carrying it by hand irrespective of the position of the select lever 6 as illustrated in FIG. 8. (Even at this time, the arm lifter 5 keeps the front end of the tone arm 3 lifted, and hence, the record stylus does not fall onto a record groove.) Then, the manual lever 33 held in magnetic attraction with the actuating protrusive piece 29b provided in the bracket 29 moving together does not have its movement regulated by the engaging protrusive piece 22b of the brake lever 22 which is now in the stop state yet. Therefore, the manual lever 33 turns until it has its movement checked by a stopper (not shown) of its own, and it moves to a position where its engaging protrusive piece 33a can engage the engaging piece 21b of the control lever 21.

When the start switch 7 is turned "on" then, the rotary member 13 turns in order to effect the lead-in operation of the tone arm 3 and the apparatus is actuated as stated above. Since the engaging piece 21b is held in engagement with the engaging protrusive piece 33a of the manual lever 33, the control lever 21 turns to the extent of turning "on" the switch 26 of the driving motor for the turntable 2 and thereafter has its movement checked. Accordingly, the rotary member 13 turns without the feed-in of the tone arm 3 by the control lever 21. It stops after having quietly lowered the front end of the tone arm 3 onto the disk as described before, and the apparatus is set for the next auto-return operation.

Subsequently, when the auto-return operation has been made under this state, the actuating projective piece 29b of the bracket 29 comes into contact with the magnet 33c of the manual lever 33 and pushes it, so that the manual lever 33 returns to the original position. In case where, in the next record performance, the auto-lead-in operation has been selected, the manual lever 33 has its turning checked by the engaging protrusive piece 22b of the brake lever 22 and does not check the movement of the control lever 21. Alternatively, in case where the manual operation has been selected again, the above operations are repeated.

In this way, in case where it is intended to manually bring the tone arm into the lead-in operation, the operations required therefor are automatically made merely by carrying the tone arm to a desired position on the disk by hand. In addition, the apparatus is thereby set for the next auto-return operation.

FIGS. 9 to 11 show another aspect of performance of the select plate. Referring to the drawings, a select plate 35 which is protrusively provided with shorter and longer pressure-receiving stoppers 35a and 35b on a side end part of the control lever 21 is attached to a supporting member 36, disposed to be protrusive from the chassis A, in a manner to vertically rock relative to the chassis A. The movement of the select plate is controlled by a control pin 37 projected from the chassis A. The select plate 35 has its one end urged in a direction away from the chassis A by a coiled compression spring 38 which is elastically disposed between the select plate and the chassis A while being wound round the control pin 37. Further, an electromagnet 39 fastened to the chassis A is disposed between the select plate and the chassis A.

Accordingly, when a select switch, not shown, disposed on the cabinet 1 is not turned "on", the electromagnet 39 is not energized and the coiled compression spring 38 pushes the select plate 35 in the direction away from the chassis A as illustrated in FIG. 10. Therefore, the positions of the stoppers are controlled by the spring, and the control lever 21 abuts on the shorter pressure-receiving stopper 35a during the lead-in of the tone arm 3. In contrast, when the select switch is turned "on", the electromagnet 39 is energized, and the select plate 35 rocks against the elastic force of the coiled compression spring 38 to lower the side on which the pressure receiving stoppers 35a and 35b are disposed. As shown in FIG. 11, therefore, the longer pressure-receiving stopper 35b abuts on the control lever 21 now. In this way, the oscillating width of the control lever 21 changes, and the lead-in operations of the tone arm 3 for disks of unequal diameters can be made.

When the select switch is turned "off" to deenergize the electromagnet 39, the select plate 35 is returned to the original position by the elastic force of the coiled compression spring 38.

FIG. 12 shows still another aspect of performance of the select plate. A select plate 40 which is protrusively provided with pressure receiving stoppers 40a and 40b on the side of the control lever 21 is supported by a shaft in a manner to horizontally turn relative to the chassis A. One of its sides is urged so as to turn clockwise by extending a coiled tension spring 41 between it and the chassis A, while an energizing rod 43 of a solenoid 42 secured to the chassis A is coupled to its other side.

Accordingly, unless a select switch not shown is turned "on", one pressure-receiving stopper 40a abuts on the control lever 21 during the lead-in operation. When the select switch is turned "on", the solenoid 42 is energized, and hence, the select plate 40 turns counterclockwise against the tractive force of the coiled tension spring 41, so that the other pressure-receiving stopper 40b abuts on the control lever 21 during the lead-in operation. In this way, the auto-lead-in for disks of unequal diameters becomes possible.

When the solenoid 42 is deenergized, the select plate 40 is moved backwards till the abutment on a stopper 44 and returned to the original position by the tractive force of the coiled tension spring 41.

As described above in detail, the tone arm-moving apparatus of the exclusive motor drive system according to this invention can effect the auto-lead-in operation and the auto-return operation of the tone arm while the rotary member rotates one revolution, by the use of the comparatively simple construction. Besides, the manual operation of the tone arm is permitted. Further, the auto-lead-in and the auto-return of stable operations can be effected.

What is claimed is:

1. In a record player having a tone arm rest (4), an arrangement for moving a tone arm (3) out of and back into said tone arm rest (4), said arrangement comprising in combination:

(a) a chassis plate (A);

(b) a rotary member (13) with an upper and a lower side, said rotary member being disposed on said plate (A) substantially at the center part thereof, said rotary member (13) including: notches (13a) on the upper side thereof, gear teeth (14) on its outer periphery, a circumferential first cam (15) whose thickness varies along its edges, said circumferential first cam (15) being at the top of said rotary member, a horizontal second cam (16) disposed on the upper side of said rotary member (13), said horizontal second cam (16) having an endless cam plate (20) with a concave recess at its intermediate part, also, protuberances (20a) which extend from the peripheral part of the cam plate (20) which fit into the notches (13a) so that the relative position of the cam plate (20) on the rotary member (13) can be adjusted, a brake control circumferential third cam (17) on the lower side of said rotary member (13) with first and second convex parts (17a, 17b), a switch actuating circumferential fourth cam (18) with first and second concave parts (18a, 18b) also on said lower side, said third and fourth cams being superposed on said rotary member (13), a brush (19) extending from the outer peripheral edge of said switch activating fourth cam (18), gear drive means including a drive motor (10), a drive gear (12) engaging said gear teeth, and, an arbor pin (12a) at the center of said drive gear (12);

(c) a C-shaped control lever (21) with a pressure receiving projection (21a), responsive to said circumferential first cam (15), said C-shaped lever having a switch pressing side piece (21c), and one and the other ends, said one end having an engaging piece (21b), said other end having a pressing pin (21d), said control lever being disposed for pivotal movement on said arbor pin (12a) so as to swing about said rotary member (13), control lever spring means (24) in the vicinity of said engaging piece (21b) and outward of said C-shaped control lever, biasing said control lever for rotation about said arbor pin (12a) in a rotary direction so that said engaging piece (21b) tends to move toward said spring means (24);

(d) a hollow cylindrical tone arm lifter (5) with an elevation rod (5a) extending through the hollow part of said tone arm lifter, said elevation rod (5a) having a bottom part disposed to engage said concave recess of the horizontal second cam (16), and a tone arm (3) operatively engaged by said tone arm lifter (5a);

(e) a select plate (25) with a defined apex pivoted at said apex to said chassis plate (A), select lever means (28, 6) for selecting a first and a second record disc size lead-in position, said select lever means (28, 6) serving to control the movement of the tone arm, said select lever means being coupled to said select plate (25), said select plate having first and second stoppers (25a, 25b), for said first and second record disc sizes, said stoppers being so disposed on said select plate on the side of said select plate opposite said defined apex so as to contact said control lever engaging piece;

(f) a bracket (29) disposed to overlap said rotary member (13), a vertical wall (29a) disposed to be engaged by said brush (19) said vertical wall (29a) extending in the direction of said brush on said bracket (29), an elongated position detector plate (30) mounted on said bracket (29), said position detector plate having a plurality of spaced apertures (30a), a brake drum (27) fastened to said tone arm (3) and disposed for engagement by said contact lever pressing pin (21b), a photointerrupter (31), disposed to engage said elongated position detector plate (30) and detect each of said spaced apertures; and, (g) brake lever means (22) having an arm with a brake shoe (22a) on one side of said C-shaped control lever (21) opposed to said brake drum (27), said brake lever means (22) being held on said plate (A) close to said rotary member (13), said brake lever means having an end disposed to be in contact with said convex parts (17a, 17b), a brake spring (34) biasing said brake drum (27), an engaging surface (22b) on said brake lever means (22), a turntable switch (26) on the other side of said C-shaped control lever (21), responsive to said switch pressing side piece (21c), a first period start manual switch (7), operatively coupled for starting the drive means, and, a second switch (23) adjacent said rotary member (13) with an actuating lever (23a) extending to the circumference of said circumferential fourth cam (18);

whereby, in a first operational phase, when said select lever means (6, 28) is first moved to a position for one of said record sizes, said select plate (25) turns to dispose the proper stopper (25a) corresponding to said selected size, opposite said engaging piece (21b), when the first switch (7) is pressed, the drive motor (10) rotates and said rotary member (13) is driven, contact actuating lever (23a) comes out of said first concave part (18a), the contact end of the brake lever means (22) is released from the first convex part (17a) and turns under the action of said brake spring (34) to bring the brake shoe (22a) into contact with the brake drum (27), the rotary member (13) further rotating, releasing the pressure of said circumferential first cam (15) on said receiving projection (21a) so that said control lever turns by the action of said control lever spring means (24) until one side of said lever abuts against said pressure receiving stopper (25a), thus, the pressing pin (21d) pushes one side of the brake drum (27), the tone arm (3) along with the bracket (29) moves toward the position of a record disc of said selected record size, simultaneously, switch pressing side piece (21c) releases said turntable switch (26) turning it on, but the tone arm remains over the lead-in position because of the contact between the brake shoe (22a) and the brake drum (27), as the rotary member (13) rotates further, said second convex part (17b) pushes the brake lever (22) to separate the brake shoe (22a) from the brake drum (27), the elevation rod (5a) falls into the recess of the horizontal second cam (16) to bring the tone arm down, also contact actuating lever (23a) falls into said second concave part (18b) to start the drive motor (10) while the rotary member (13) stops after having turned a predetermined angle, then, in a second operational phase, when the record playing is finished, the photo interrupter (31) and the position detection plate (30) detect the position of the tone arm, the rotary member (13) starts rotating, the brake lever (22) is released from the pressing action of said second convex part (17b), the brake shoe (22a) engages the brake drum (27), while the contact actuating lever (23a) gets out of second concave part (18b), the brake lever means causes the elevation rod (5a) to get out of said concave recess so as to lift up the tone arm (3), the brush (19) pushes the vertical wall (29a) and turns it to return the tone arm to said tone arm rest (4), also, the circumferential first cam (15) turns the control lever to its original position against the force of said control lever spring means (24) the switch pressing piece (21c) presses the turntable switch (26) to the OFF position, the brake lever (22) is turned by the first convex part (17a) and when the brake shoe (22a) has come away from the brake drum (27) the contact actuating lever (23a) falls into said first concave part (18a) to open the circuit of said drive motor (10) to stop said rotary member (13).

* * * * *